United States Patent
Wang et al.

(10) Patent No.: US 10,032,251 B2
(45) Date of Patent: Jul. 24, 2018

(54) DISPLAY DEVICE, DISPLAY SYSTEM AND RESOLUTION ADJUSTING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wei Wang, Beijing (CN); Hao Zhang, Beijing (CN); Lingyun Shi, Beijing (CN); Xue Dong, Beijing (CN); Chong Liu, Beijing (CN)

(73) Assignees: BOE TECHNOLOGY GROUP CO., LTD, Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 21 days.

(21) Appl. No.: 15/107,854

(22) PCT Filed: Jan. 13, 2016

(86) PCT No.: PCT/CN2016/070797
§ 371 (c)(1),
(2) Date: Jun. 23, 2016

(87) PCT Pub. No.: WO2017/024765
PCT Pub. Date: Feb. 16, 2017

(65) Prior Publication Data
US 2017/0046815 A1  Feb. 16, 2017

(30) Foreign Application Priority Data
Aug. 12, 2015  (CN) .......................... 2015 1 0494589

(51) Int. Cl.
*G06T 3/40* (2006.01)
*G01B 11/02* (2006.01)
(Continued)

(52) U.S. Cl.
CPC ................ *G06T 3/40* (2013.01); *G01B 11/02* (2013.01); *G06F 3/011* (2013.01); *G09G 5/391* (2013.01);
(Continued)

(58) Field of Classification Search
CPC . H04N 13/0468–13/0484; G06F 3/011–3/017; G06F 1/3262;
(Continued)

(56) References Cited

U.S. PATENT DOCUMENTS

2008/0292312 A1* 11/2008 Oron .................. H04B 10/0795
398/33
2010/0171697 A1* 7/2010 Son ......................... G06F 3/012
345/158
(Continued)

FOREIGN PATENT DOCUMENTS

CN  101609659 A  12/2009
CN  101751209 A  6/2010
(Continued)

OTHER PUBLICATIONS

International Search Report and Written Opinion in PCT/CN2016/070797, with English translation. 16 pages.
(Continued)

*Primary Examiner* — Daniel Hajnik
(74) *Attorney, Agent, or Firm* — Womble Bond Dickinson (US) LLP

(57) ABSTRACT

The present disclosure relates to a display device, a display system and a resolution adjusting method. The display device comprises a display screen, and further comprises: a
(Continued)

distance sensor and an adjusting unit, wherein the distance sensor comprises: a particle emitter for emitting a first particle beam to a viewer; a particle receiver for receiving the first particle beam reflected by the viewer, and wherein the adjusting unit adjusts a resolution of the display screen based on an energy density of the emitted first particle beam and an energy density of the received first particle beam.

13 Claims, 4 Drawing Sheets

(51) Int. Cl.
*G09G 5/391* (2006.01)
*G06F 3/01* (2006.01)
*G06K 9/00* (2006.01)

(52) U.S. Cl.
CPC ..... *G06K 9/00228* (2013.01); *G09G 2340/04* (2013.01); *G09G 2354/00* (2013.01)

(58) Field of Classification Search
CPC .............. G06F 1/3265; G06K 9/00335; G06K 9/00355; G06K 9/00362–9/00389; G01B 11/02; G01B 11/04; G01B 11/14; G01B 11/25; G01B 11/026; G01B 11/0691; G01B 11/245
USPC ................................. 356/602, 623, 625, 634
See application file for complete search history.

(56) References Cited

U.S. PATENT DOCUMENTS

| | | | |
|---|---|---|---|
| 2011/0211114 A1* | 9/2011 | Cooper | H04N 21/44218 348/441 |
| 2013/0086531 A1* | 4/2013 | Sugita | G06F 3/017 715/863 |
| 2014/0306954 A1* | 10/2014 | Kao | G06T 17/00 345/420 |
| 2015/0179150 A1 | 6/2015 | Andrysco et al. | |
| 2015/0253428 A1* | 9/2015 | Holz | G01S 17/42 356/5.01 |
| 2015/0277841 A1* | 10/2015 | Lanier | G06F 3/014 345/428 |
| 2016/0094705 A1* | 3/2016 | Vendrow | G06K 9/0061 382/103 |

FOREIGN PATENT DOCUMENTS

| | | |
|---|---|---|
| CN | 102611855 A | 7/2012 |
| CN | 102611855 A | 7/2012 |
| CN | 104361849 A | 2/2015 |
| CN | 104361849 A | 2/2015 |
| CN | 105100506 A | 11/2015 |
| CN | 105183149 A | 12/2015 |

OTHER PUBLICATIONS

Office Action in Chinese Application No. 201510494589.X dated Jul. 26, 2017, with English translation.
"Second office action," CN Application No. 201510494589.X (dated Dec. 17, 2017).

* cited by examiner

DISPLAY DEVICE, DISPLAY SYSTEM AND RESOLUTION ADJUSTING METHOD

The present application is the U.S. national phase entry of PCT/CN2016/070797, with an international filing date of Jan. 13, 2016, which claims the benefit of Chinese Patent Application No. 201510494589.X, filed on Aug. 12, 2015, the entire disclosure of which is incorporated herein by reference.

FIELD

The present disclosure relates to the field of display technology, particularly to a display device, a display system and a resolution adjusting method.

BACKGROUND

High PPI (Pixels Per Inch) is always an important target in the display field, and has once become an important selling point of products such as mobile phones and televisions. However, high PPI also brings some disadvantages while bringing advantages such as good viewing effect. High PPI would result in increase of the data processed by the GPU (Graphics Processing Unit), thereby resulting in large power consumption of the battery.

Actually, the resolution of human eyes is not always invariable; it generally varies at any moment based on distance, environments, and running speeds of images. An important theory is the "retina" standard proposed by Apple Inc. that when the viewer is 10-12 inches (about 25-30 cm) from the display screen, and as long as the resolution of the display screen reaches 300 ppi (300 pixel points per inch) and above, the viewer's retina will not be able to identify the pixel points, i.e., granular sensation will not be perceived.

Therefore, when human eyes are very close to a mobile phone, in order to prevent consumers from seeing minor flaws on the display screen, and try to show the perfect picture, the high resolution of the mobile phone itself can be used. However, when the screen is relatively far from the user, even if the resolution does not meet the above one, the user would not be able to identify the pixel points either; therefore, it is unnecessary to always keep the display screen at a relatively high resolution so as to result in excessive consumption of electricity.

SUMMARY

The technical problem to be solved by the present disclosure is how to adjust the resolution of the display screen based on the viewing distance of the user.

For this purpose, the present disclosure proposes a display device, comprising a display screen, characterized by further comprising: a distance sensor and an adjusting unit, wherein the distance sensor comprises:

a particle emitter for emitting a first particle beam to a viewer;

a particle receiver for receiving the first particle beam reflected by the viewer, and wherein the adjusting unit adjusts a resolution of the display screen based on an energy density of the emitted first particle beam and an energy density of the received first particle beam.

In an embodiment, the distance sensor further comprises:

a processing unit for obtaining a viewing distance of the viewer from the display screen based on the energy density of the emitted first particle beam and the energy density of the received first particle beam, and wherein the adjusting unit adjusts the resolution of the display screen based on the viewing distance.

In an embodiment, the processing unit is further used for obtaining an exit position of the first particle beam and an incident position of the first particle beam on the display screen, so as to obtain a first distance from the exit position to the incident position;

obtaining a second distance propagated by the first particle beam based on an attenuated energy density of the first particle beam;

and obtaining the viewing distance based on the first distance and the second distance.

In an embodiment, the distance sensor further comprises:

a processing unit for obtaining an attenuated energy density of the first particle beam based on the energy density of the emitted first particle beam and the energy density of the received first particle beam, if the attenuated energy density is greater than a first preset value, it is determined that a viewing distance is greater than a first value, if the attenuated energy density is less than a second preset value, it is determined that the viewing distance is less than a second value, and the adjusting unit adjusts the resolution of the display screen based on the viewing distance.

In an embodiment, the adjusting unit reduces the resolution of the display screen when the viewing distance is greater than the first value.

In an embodiment, the adjusting unit increases the resolution of the display screen when the viewing distance is less than the second value.

In an embodiment, the first particle beam is an infrared light ray.

In an embodiment, the first particle beam is an electron beam.

In an embodiment, the display device further comprises:

a human face recognition unit for recognizing whether the face of the viewer is facing towards the display screen, wherein the adjusting unit reduces the resolution of the display screen when the face of the viewer is not facing towards the display screen.

The present disclosure further proposes a display system, comprising the above display device, further comprising:

a wearable device for emitting a second particle beam to the display device when the particle emitter does not emit the first particle beam, wherein the processing unit is further used for detecting an energy density of the received second particle beam, and the adjusting unit is further used for adjusting the resolution of the display screen based on the energy density of the received second particle beam.

The present disclosure further proposes a resolution adjusting method based on the above display device, comprising:

emitting a first particle beam to a viewer;

receiving the first particle beam reflected by the viewer;

adjusting a resolution of the display screen based on an energy density of the emitted first particle beam and an energy density of the received first particle beam.

In an embodiment, adjusting a resolution of the display screen based on an energy density of the emitted first particle beam and an energy density of the received first particle beam comprises:

obtaining a viewing distance based on the energy density of the emitted first particle beam and the energy density of the received first particle beam;

adjusting the resolution of the display screen based on the viewing distance.

In an embodiment, obtaining a viewing distance based on the energy density of the emitted first particle beam and the energy density of the received first particle beam comprises:

obtaining an exit position of the first particle beam and an incident position of the first particle beam on the display screen, so as to obtain a first distance from the exit position to the incident position;

obtaining a second distance propagated by the first particle beam based on an attenuated energy density of the first particle beam;

obtaining the viewing distance based on the first distance and the second distance.

In an embodiment, adjusting a resolution of the display screen based on an energy density of the emitted first particle beam and an energy density of the received first particle beam comprises:

obtaining an attenuated energy density of the first particle beam based on the energy density of the emitted first particle beam and the energy density of the received first particle beam, if the attenuated energy density is greater than a first preset value, it is determined that a viewing distance is greater than a first value, if the attenuated energy density is less than a second preset value, it is determined that the viewing distance is less than a second value.

In an embodiment, adjusting the resolution of the display screen comprises:

reducing the resolution of the display screen when the viewing distance is greater than the first value.

In an embodiment, adjusting the resolution of the display screen comprises:

increasing the resolution of the display screen when the viewing distance is less than the second value.

In an embodiment, the resolution adjusting method further comprises:

recognizing whether the face of the viewer is facing towards the display screen, and reducing the resolution of the display screen when the face of the viewer is not facing towards the display screen.

The present disclosure further proposes a resolution adjusting method based on the above display system, comprising:

emitting a second particle beam to the display device;

detecting an energy density of the received second particle beam, and adjusting the resolution of the display screen based on the energy density of the received second particle beam.

By means of the technical solution above, the resolution of the display screen can be adjusted based on a viewing distance from the viewer to the display screen, when the viewing distance of the user is relatively large, the resolution of the display screen is reduced appropriately so as to reduce the power consumption of the display screen on the premise of ensuring the viewing effect of the user.

BRIEF DESCRIPTION OF THE DRAWINGS

The features and the advantages of the present disclosure will be understood more clearly with reference to the drawings, which are schematic and should not be understood as any limitations to the present disclosure, in the drawings.

DETAILED DESCRIPTION

In order to understand the above purposes, features and advantages of the present disclosure more clearly, the present disclosure will be described in more detail with reference to the drawings and specific embodiments in the following. It should be noted that the embodiments and the features in the embodiments of the present application can be combined with one another in the case of no conflict.

Many specific details are elaborated in the following for the convenience of understanding the present disclosure sufficiently; however, the present disclosure can also be implemented using other manners different from those described herein. Hence, the claimed scope of the present disclosure is not limited by the specific embodiments disclosed below.

Figure 1:
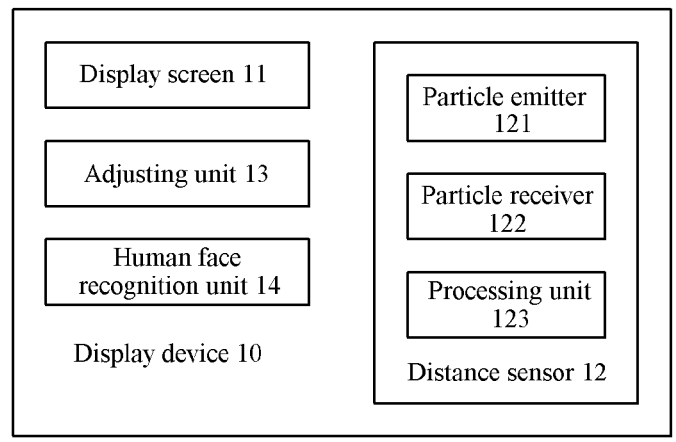
FIG. 1 shows a schematic block diagram of a display device according to an embodiment of the present disclosure.

As shown in FIG. 1, a display device 10 according to an embodiment of the present disclosure comprises a display screen 11, and further comprises: a distance sensor 12 and an adjusting unit 13, wherein the distance sensor 12 comprises:

a particle emitter 121 for emitting a first particle beam to a viewer;

a particle receiver 122 for receiving the first particle beam reflected by the viewer, and wherein the adjusting unit 13 adjusts a resolution of the display screen based on an energy density of the emitted first particle beam and an energy density of the received first particle beam.

The distance sensor 12 in this embodiment can be arranged on the display screen 11 of the display device 10. Generally, when a user views the display screen 11, the human eyes are relatively close to the display screen 11 (for example, when viewing the display screen of a mobile phone, the distance is generally at about 20 cm). Since the particles are emitted at an extremely high speed, if the distance is determined by detecting the time difference between emitting particles and receiving particles, it is quite difficult to determine the time difference; hence, the distance calculated is also not accurate enough. This embodiment determines the distance by detecting the energy density of the emitted first particle beam and the energy density of the received first particle beam, in this way, the accuracy in determining the distance can be improved greatly relative to determining the distance by detecting the time difference between emitting particles and receiving particles.

This embodiment can determine the value range of the viewing distance from the viewer to the display screen 11 based on the energy density of the emitted first particle beam and the energy density of the received first particle beam, thereby adjusting the resolution of the display screen 11 based on the value range of the viewing distance. When the viewing distance of the user is relatively large, the resolution of the display screen 11 can be reduced appropriately, thus the power consumption of the display screen can be reduced on the premise of ensuring the viewing effect of the user.

The distance sensor 12 can further comprise:

a processing unit 123 for obtaining a viewing distance of the viewer from the display screen 11 based on the energy density of the emitted first particle beam and the energy density of the received first particle beam.

The adjusting unit 13 adjusts the resolution of the display screen 11 based on the viewing distance.

For example, the energy density of the received first particle beam is I, $I=AI_0e^{-\mu H}$.

Wherein I is the energy density of the first particle beam incident to the display screen 11 after being propagated in the medium; $I_0$ is the energy density of the emitted first particle beam; e is the base of natural logarithm; $\mu$ is the linear attenuation coefficient of photon; H is the viewing distance.

Thereby, it can arrive at $H=-(1/\mu)*\ln(I/AI_0)$.

Figure 2:
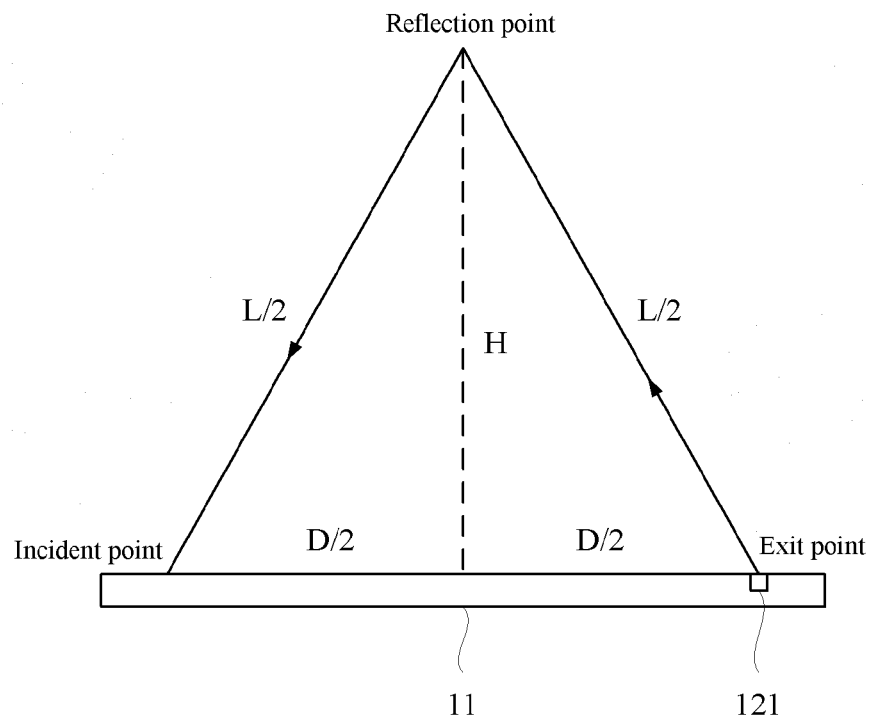
FIG. 2 shows a schematic view of calculating a viewing distance according to an embodiment of the present disclosure.

As shown in FIG. 2, the processing unit 123 is further used for obtaining an exit position of the first particle beam and an incident position of the first particle beam on the display screen 11 (wherein the particle receiver 122 can be in a plane shape, and arranged on the surface of the display screen 11, so as to receive the first particle beam incident to the display screen 11), so as to obtain a first distance from the exit position to the incident position;

obtaining a second distance propagated by the first particle beam based on an attenuated energy density of the first particle beam;

obtaining the viewing distance based on the first distance and the second distance.

The exit position of the first particle beam can be determined based on the position of the particle emitter 121. The exit position and the incident position of the first particle beam, and the reflection points of the first particle beam on the viewer's face can constitute a triangle, and generally when the viewer is viewing the display screen 11 from the front, the distance from the exit point of the electron beam to the reflection point and the distance from the reflection point to the incident point are approximately equal.

That is, the above triangle can be approximately an isosceles triangle generally, wherein a first distance D is the length of the base of the isosceles triangle, a second distance L is the sum of the lengths of two waists of the isosceles triangle, and the viewing distance H is the height of the isosceles triangle. It can arrive at $H^2+(D/2)^2=(L/2)^2$ based on the Pythagorean proposition, and the viewing distance H can be derived in turn.

The viewing distance calculated according to this embodiment is a vertical distance from the user to the display screen, which is more close to the actual distance from the user to the display screen.

The distance sensor 12 can further comprise:

a processing unit 123 for obtaining an attenuated energy density of the first particle beam based on the energy density of the emitted first particle beam and the energy density of the received first particle beam, if the attenuated energy density is greater than a first preset value, it is determined that a viewing distance is greater than a first value, if the attenuated energy density is less than a second preset value, it is determined that the viewing distance is less than a second value, the adjusting unit 13 adjusts the resolution of the display screen 11 based on the viewing distance.

This embodiment can determine the relationship between the viewing distance and the first value and the second value directly based on the attenuated energy density of the first particle beam without having to calculate the specific viewing distance, so as to perform the adjusting operation, which simplifies the calculation steps and improves the speed for determination.

It should be noted that the operations of emitting and receiving the first particle beam and calculating the energy density by the distance sensor 12 in the above embodiment can be performed in a preset period, so as to avoid excessive power consumption caused by frequent calculations.

The adjusting unit 13 can reduce the resolution of the display screen 11 when the viewing distance is greater than the first value.

When the viewing distance is relatively large (larger than the first distance), the identification ability of the user to the pixel points will be reduced; thus, the resolution of the display screen 11 can be reduced so as to save electric energy on the premise of ensuring the viewing effect of the user.

The adjusting unit 13 can increase the resolution of the display screen 11 when the viewing distance is less than the second value.

When the viewing distance is relatively small (less than the second distance), the identification ability of the user to the pixel points will be improved; thus, the resolution of the display screen 11 can be increased so as to ensure the viewing effect of the user.

It should be noted that the second distance is less than the first distance. When the viewing distance is between the second distance and the first distance, the display screen 11 can be maintained to display images with a normal resolution.

The first particle beam can be an infrared light ray.

If the distance is measured by emitting and receiving the infrared light ray, on the one hand, since the infrared light ray is invisible light, it can avoid interference to user viewing; on the other hand, since the infrared light ray has much less damage to the human body relative to the UV light, it can ensure minimum damage to the human body while accomplishing distance determination.

The first particle beam can be an electron beam.

If the distance is measured by emitting and receiving the electron beam, on the one hand, since human eyes cannot see the electron beam, it can avoid interference to user viewing; on the other hand, since the energy density of the electron beam is relatively large, it can still have a relatively high energy density after being reflected by the face of the viewer, which is convenient for reception and improving subsequent calculation accuracy.

The display device can further comprise:

a human face recognition unit 14 for recognizing whether the face of the viewer is facing towards the display screen 11, wherein the adjusting unit 13 reduces the resolution of the display screen 11 when the face of the viewer is not facing towards the display screen 11.

When the viewer is not facing towards the display screen 11, it indicates that the user is not viewing the display screen, or is viewing the display screen 11 from the side. If the user is not viewing the display screen 11, the resolution can be reduced so as to save electric energy. If the user is viewing the display screen 11 from the side, the identification ability to the pixel points will also be reduced relative to viewing the display screen 11 from the front; hence, the resolution can also be reduced to save electric energy.

Figure 3:
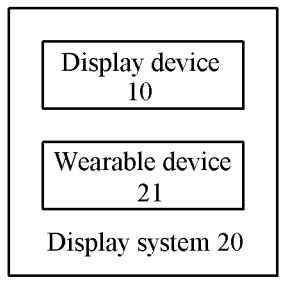
FIG. 3 is a schematic block diagram of a display system according to an embodiment of the present disclosure.

As shown in FIG. 3, the present disclosure further proposes a display system 20, comprising the above display device 10, and further comprising:

a wearable device 21 for emitting a second particle beam to the display device when the particle emitter 121 does not emit the first particle beam, wherein the processing unit 123 is further used for detecting an energy density of the received second particle beam, and the adjusting unit 13 is further used for adjusting the resolution of the display screen based on the energy density of the received second particle beam.

The user can wear the wearable device 21 matching with the display device 10. A second particle beam is emitted through the wearable device 21 to the display device, and there is no need for the display device 10 itself to emit the first particle beam, which further improves the endurance ability of the display device 10. Wherein, the wearable device 21 can be smart glasses, intelligent headbands, and smart headphones and so on.

Figure 4:
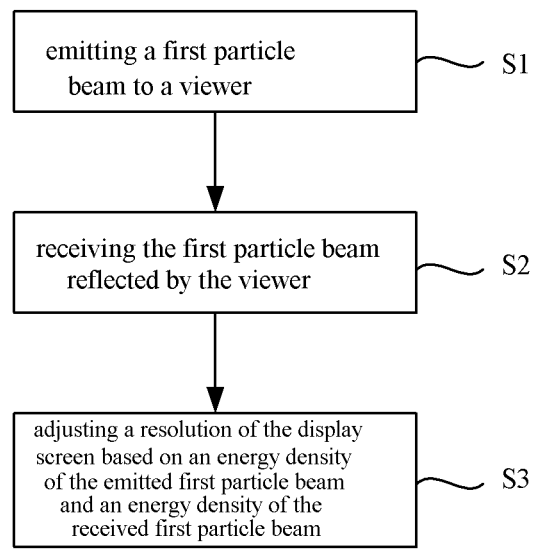
FIG. 4 shows a schematic flow chart of a resolution adjusting method according to an embodiment of the present disclosure.

As shown in FIG. 4, the present disclosure further proposes a resolution adjusting method based on the above display device 10, comprising:

S1, emitting a first particle beam to a viewer;

S2, receiving the first particle beam reflected by the viewer;

S3, adjusting a resolution of the display screen based on an energy density of the emitted first particle beam and an energy density of the received first particle beam.

Figure 5:
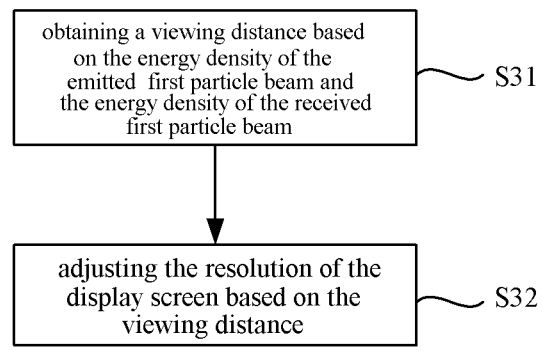
FIG. 5 shows a specific schematic flow chart of a resolution adjusting method according to an embodiment of the present disclosure.

As shown in FIG. 5, adjusting a resolution of the display screen based on an energy density of the emitted first particle beam and an energy density of the received first particle beam comprises:

S31, obtaining a viewing distance based on the energy density of the emitted first particle beam and the energy density of the received first particle beam;

S32, adjusting the resolution of the display screen based on the viewing distance.

Figure 6:
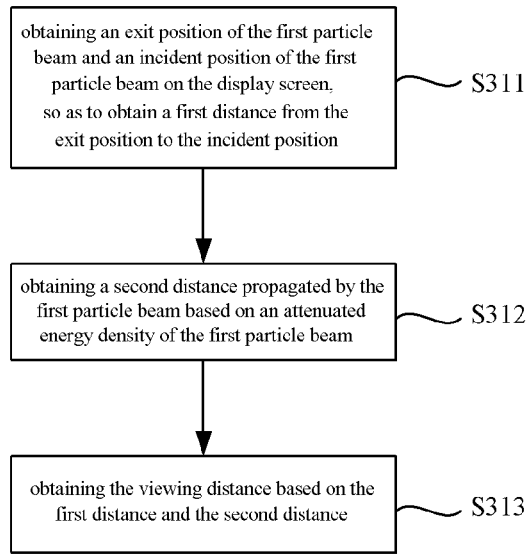
FIG. 6 shows a specific schematic flow chart of calculating a viewing distance according to a further embodiment of the present disclosure.

As shown in FIG. 6, obtaining a viewing distance based on the energy density of the emitted first particle beam and the energy density of the received first particle beam comprises:

S311, obtaining an exit position of the first particle beam and an incident position of the first particle beam on the display screen, so as to obtain a first distance from the exit position to the incident position;

S312, obtaining a second distance propagated by the first particle beam based on an attenuated energy density of the first particle beam;

S313, obtaining the viewing distance based on the first distance and the second distance.

Figure 7:
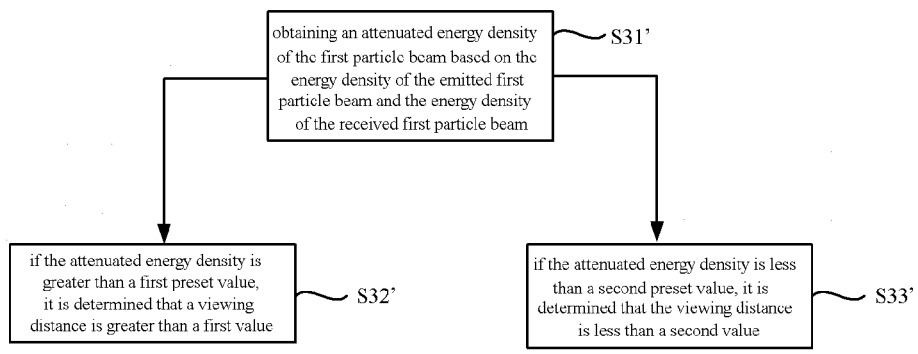
FIG. 7 shows a specific schematic flow chart of a resolution adjusting method according to a further embodiment of the present disclosure.

As shown in FIG. 7, adjusting a resolution of the display screen based on an energy density of the emitted first particle beam and an energy density of the received first particle beam comprises:

S31', obtaining an attenuated energy density of the first particle beam based on the energy density of the emitted first particle beam and the energy density of the received first particle beam, S32', if the attenuated energy density is greater than a first preset value, it is determined that a viewing distance is greater than a first value, S33', if the attenuated energy density is less than a second preset value, it is determined that the viewing distance is less than a second value.

Adjusting the resolution of the display screen can comprise:

reducing the resolution of the display screen when the viewing distance is greater than the first value.

Adjusting the resolution of the display screen can comprise:

increasing the resolution of the display screen when the viewing distance is less than the second value.

The resolution adjusting method can further comprise:

recognizing whether the face of the viewer is facing towards the display screen, and reducing the resolution of the display screen when the face of the viewer is not facing towards the display screen.

Figure 8:
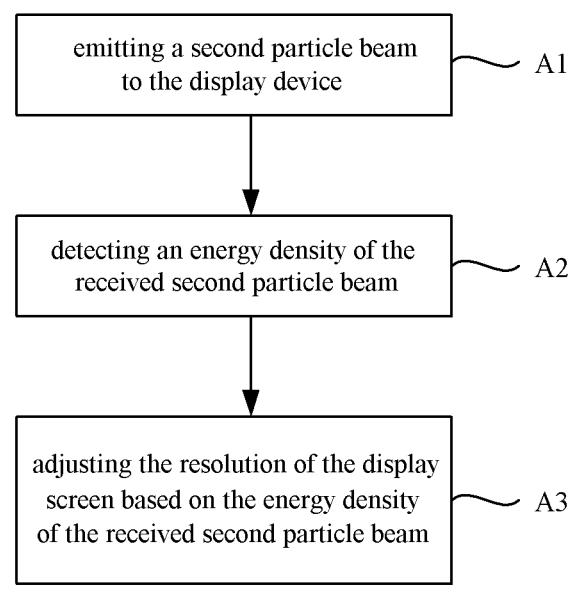
FIG. 8 shows a schematic flow chart of a resolution adjusting method according to a further embodiment of the present disclosure.

As shown in FIG. 8, the present disclosure further proposes a resolution adjusting method based on the above display system 20, comprising:

A1, emitting a second particle beam to the display device;

A2, detecting an energy density of the received second particle beam;

A3, adjusting the resolution of the display screen based on the energy density of the received second particle beam.

It should be noted that the display device in the above embodiment can be any product or component with the display function, such as electronic paper, a mobile phone, a tablet computer, a television, a laptop, a digital photo frame, a navigator etc.

The technical solutions of the present disclosure have been illustrated above in detail with reference to the drawings. In the prior art, it is always maintained at a relatively high resolution when displaying images, which results in waste of electricity. By means of the technical solution of the present disclosure, the resolution of the display screen can be adjusted based on a viewing distance from the viewer to the display screen. When the viewing distance of the user is relatively large, the resolution of the display screen is reduced appropriately so as to reduce the power consumption of the display screen on the premise of ensuring the viewing effect of the user.

In the present disclosure, the terms such as "first", "second" are only used for purpose of description, and should not be understood as indicating or implying relative importance. The term "a plurality of" refer to two or more than two, unless otherwise specified.

What are stated above are only preferred embodiments of the present disclosure, which are not used for limiting the present disclosure. For the skilled person in the art, various modifications and variations can be made to the present disclosure. Any modification, equivalent replacement, improvement and so on made within the spirit and the principle of the present disclosure should be encompassed within the claimed scope of the present disclosure.

The invention claimed is:

1. A display device, comprising a display screen, and further comprising: a distance sensor and an adjusting circuit, wherein the distance sensor comprises:

a particle emitter for emitting a first particle beam to a viewer;

a particle receiver for receiving the first particle beam reflected by the viewer, and wherein the adjusting circuit adjusts a resolution of the display screen based on an energy density of the emitted first particle beam and an energy density of the received first particle beam, wherein the first particle beam is an infrared light ray, wherein the distance sensor further comprises: a processing circuit for obtaining a viewing distance of the viewer from the display screen based on the energy density of the emitted first particle beam and the energy density of the received first particle beam, and wherein the adjusting circuit adjusts the resolution of the display screen based on the viewing distance, and wherein the processing circuit is further used for obtaining an exit position of the first particle beam and an incident position of the first particle beam on the display screen, so as to obtain a first distance from the exit position to the incident position, obtaining a second distance propagated by the first particle beam based on an attenuated energy density of the first particle beam, and obtaining the viewing distance based on the first distance and the second distance.

2. The display device according to claim 1, wherein the distance sensor further comprises:

a processing circuit for obtaining an attenuated energy density of the first particle beam based on the energy density of the emitted first particle beam and the energy density of the received first particle beam, if the attenuated energy density is greater than a first preset value, it is determined that a viewing distance is greater than a first value, if the attenuated energy density is less than a second preset value, it is determined that the viewing distance is less than a second value, and wherein the adjusting circuit adjusts the resolution of the display screen based on the viewing distance.

3. The display device according to claim 2, wherein the adjusting circuit reduces the resolution of the display screen when the viewing distance is greater than the first value.

4. The display device according to claim 2, wherein the adjusting circuit increases the resolution of the display screen when the viewing distance is less than the second value.

5. A display system, comprising a display device according to claim 2, further comprising:

a wearable device for emitting a second particle beam to the display device when the particle emitter does not emit the first particle beam, wherein the processing circuit is further used for detecting an energy density of the received second particle beam, and the adjusting circuit is further used for adjusting the resolution of the display screen based on the energy density of the received second particle beam.

6. The display device according to claim 1, further comprising:

a human face recognition circuit for recognizing whether the face of the viewer is facing towards the display screen, wherein the adjusting circuit reduces the resolution of the display screen when the face of the viewer is not facing towards the display screen.

7. A display system, comprising a display device according to claim 1, further comprising:

a wearable device for emitting a second particle beam to the display device when the particle emitter does not emit the first particle beam, wherein the processing circuit is further used for detecting an energy density of the received second particle beam, and the adjusting circuit is further used for adjusting the resolution of the display screen based on the energy density of the received second particle beam.

8. A resolution adjusting method, comprising:

emitting a first particle beam to a viewer using a particle emitter;

receiving the first particle beam reflected by the viewer using a particle receiver;

adjusting a resolution of the display screen based on an energy density of the emitted first particle beam and an energy density of the received first particle beam using an adjusting circuit, wherein the first particle beam is an infrared light ray, wherein adjusting a resolution of the display screen based on an energy density of the emitted first particle beam and an energy density of the received first particle beam comprises:

obtaining a viewing distance based on the energy density of the emitted first particle beam and the energy density of the received first particle beam;

adjusting the resolution of the display screen based on the viewing distance, and wherein obtaining a viewing distance based on the energy density of the emitted first particle beam and the energy density of the received first particle beam comprises:

obtaining an exit position of the first particle beam and an incident position of the first particle beam on the display screen, so as to obtain a first distance from the exit position to the incident position;

obtaining a second distance propagated by the first particle beam based on an attenuated energy density of the first particle beam;

obtaining the viewing distance based on the first distance and the second distance.

9. The resolution adjusting method according to claim 8, wherein adjusting a resolution of the display screen based on an energy density of the emitted first particle beam and an energy density of the received first particle beam comprises:

obtaining an attenuated energy density of the first particle beam based on the energy density of the emitted first particle beam and the energy density of the received first particle beam, if the attenuated energy density is greater than a first preset value, it is determined that a viewing distance is greater than a first value, if the attenuated energy density is less than a second preset value, it is determined that the viewing distance is less than a second value.

10. The resolution adjusting method according to claim 9, wherein adjusting the resolution of the display screen comprises:

reducing the resolution of the display screen when the viewing distance is greater than the first value.

11. The resolution adjusting method according to claim 9, wherein adjusting the resolution of the display screen comprises:

increasing the resolution of the display screen when the viewing distance is less than the second value.

12. The resolution adjusting method according to claim 8, further comprising:

recognizing whether the face of the viewer is facing towards the display screen, and reducing the resolution of the display screen when the face of the viewer is not facing towards the display screen.

13. The resolution adjusting method according to claim 8, comprising:

emitting a second particle beam to the display device using a wearable device;
detecting an energy density of the received second particle beam using a processing circuit, and
adjusting the resolution of the display screen based on the energy density of the received second particle beam using an adjusting circuit,
wherein the second particle beam is an infrared light ray.

* * * * *